W. HALLOCK.
PROCESS OF MANUFACTURING SULFURIC ACID.
APPLICATION FILED JULY 15, 1905.
930,471. Patented Aug. 10, 1909.
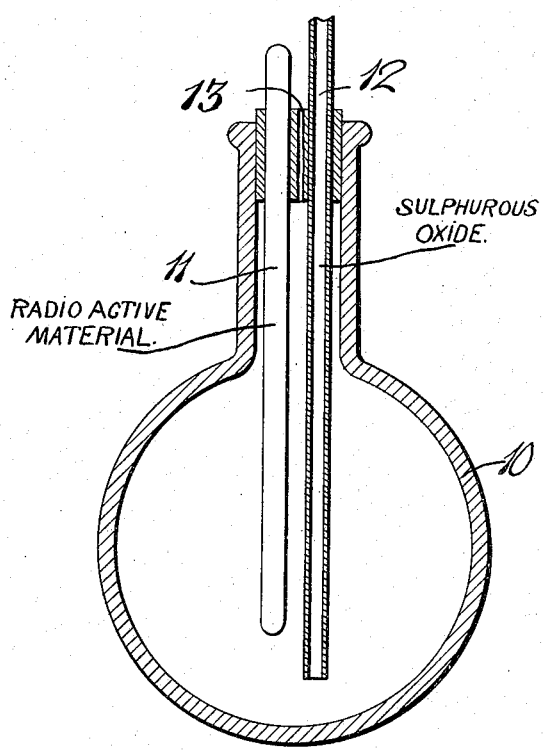

UNITED STATES PATENT OFFICE.

WILLIAM HALLOCK, OF NEW YORK, N. Y.

PROCESS OF MANUFACTURING SULFURIC ACID.

No. 930,471.     Specification of Letters Patent.     Patented Aug. 10, 1909.

Application filed July 15, 1905. Serial No. 269,850.

*To all whom it may concern:*

Be it known that I, WILLIAM HALLOCK, of the city, county, and State of New York, have invented a new and Improved Process of Manufacturing Sulfuric Acid, of which the following is a full, clear, and exact description.

My invention relates to improvements in the manufacture of sulfuric acid by the oxidation of sulfurous oxid ($SO_2$) to sulfuric oxid ($SO_3$). This is a common method in general, but heretofore it has been done by using the fumes of concentrated nitric acid or by the "catalytic" action of platinum black upon asbestos or some other medium, or by other special means involving rather elaborate apparatus and treatment. My invention, however, is intended to do away with most of the apparatus generally used, and simplify the process. It comprises the oxidation of the sulfurous oxid by means of the ionization of one or more of the gases evolved by radium, thorium, uranium or other radio-active substance or by X-rays, Kathode rays, Lenard rays, or ultra violet light or other ionizing substance or agency. I have found that a comparatively feeble agent serves to bring about the oxidation of sulfurous oxid if oxygen is present, and the ionizing influences serve to accomplish this result, that is, to put the atmosphere in such a condition as to precipitate the acid. I do not confine myself to any means of putting the atmosphere in which the treatment is effected, into this ionizing condition, and am showing simply a means of doing it.

Reference is to be had to the accompanying drawing forming a part of this specification, in which similar reference characters indicate corresponding parts.

The drawing shows simply a containing flask or receptacle 10, in which is suspended a rod 11, and this has upon its surface a coating of radium or so-called Polonium or other radio-active material. The flask has also a leading-in tube 12, through which the sulfurous oxid is conveyed to the flask and an outlet 13 through which the resultant gases may escape. In this apparatus a little mixed air and sulfur dioxid and water vapor can be passed into the flask and subjected to the ionizing influence of the material on the rod. The $SO_2$ is instantly oxidized to $SO_3$, and this combining with the water vapor forms sulfuric acid, which collects in the bottom of the flask and upon its walls.

I have shown the above described apparatus simply to illustrate how the operation can be carried on, but the apparatus forms no part of the invention, and the only thing required is to bring the sulfurous oxid $SO_2$ into the presence of any ionizing agent, and in the presence of oxygen. I have found that if the sulfurous oxid is brought into the presence of radio-active material even in atmospheric air, the necessary oxidation occurs. It is known that gases in the ionized condition are particularly active chemically, as well as electrical conductors, and under the circumstances named, one or more of the gases becomes partially ionized and the oxidation of the sulfurous oxid takes place as a consequence.

Having thus fully described my invention, I claim as new and desire to secure by Letters Patent:—

1. The herein described method of making sulfuric acid, which consists in subjecting sulfurous oxid ($SO_2$) to the influence of an ionizing agent in the presence of oxygen.

2. The herein described method of making sulfuric acid, which consists in putting sulfurous oxid ($SO_2$) and oxygen in an ionized condition, whereby the $SO_2$ is oxidizied to $SO_3$.

3. An improvement in the art of making sulfuric acid, which consists in injecting sulfurous oxid into an ionized atmosphere containing oxygen.

WILLIAM HALLOCK.

Witnesses:
WARREN B. HUTCHINSON,
ROBT. D. KENT.